US006670971B1

(12) United States Patent
Oral

(10) Patent No.: US 6,670,971 B1
(45) Date of Patent: Dec. 30, 2003

(54) INTERNET TELEVISION SYSTEM AND METHOD WITH USER SELECTABLE GENRES AND SCHEDULE

(75) Inventor: Emre Oral, London (GB)

(73) Assignee: Onder Uzel, Istanbul (TR)

( * ) Notice: Subject to any disclaimer, the term of this patent is extended or adjusted under 35 U.S.C. 154(b) by 0 days.

(21) Appl. No.: 09/569,143

(22) Filed: May 11, 2000

(51) Int. Cl.[7] ............................. G06F 3/00; H04N 7/173
(52) U.S. Cl. ...................... 345/769; 345/733; 345/744; 345/810; 345/835; 725/44; 725/45
(58) Field of Search ................................ 345/716, 717, 345/733, 744, 745–747, 762–765, 769, 810, 811, 813, 825, 835, 840, 846, 902, 963; 348/552, 906; 725/32, 34, 37, 39, 44–47, 52, 86, 87, 91, 109–113

(56) References Cited

U.S. PATENT DOCUMENTS

| 5,945,988 | A | * | 8/1999 | Williams et al. ............. 345/747 |
| 5,973,683 | A | | 10/1999 | Cragun et al. |
| 6,025,837 | A | * | 2/2000 | Matthews et al. ........... 345/721 |
| 6,029,045 | A | * | 2/2000 | Picco et al. .................... 725/34 |
| 6,091,411 | A | * | 7/2000 | Straub et al. ................ 345/747 |
| 6,388,714 | B1 | * | 5/2002 | Schein et al. ............... 348/563 |
| 6,411,307 | B1 | * | 6/2002 | Rosin et al. ................. 345/716 |
| 6,434,621 | B1 | * | 8/2002 | Pezzillo et al. ............. 709/231 |
| 6,587,127 | B1 | * | 7/2003 | Leeke et al. ................. 345/765 |

FOREIGN PATENT DOCUMENTS

| JP | 410228687 A | * | 8/1998 | ............. G11B/15/02 |
| JP | 410256875 A | * | 9/1998 | ............... H03J/5/02 |
| WO | WO 00/40028 | * | 7/2000 | ............. H04N/7/173 |

OTHER PUBLICATIONS

Janet GRECO, "Data Preparation of Interactive Electronic Program Guides," Sep. 12–16, 1996, pp. 294–297.*
"Sharp Announces Partnership With Replay Networks for Branded Personal Digital Video Recorders," Jan. 6, 2000, Busine Wire, p1458.*

* cited by examiner

Primary Examiner—John Cabeca
Assistant Examiner—X. L. Bautista
(74) Attorney, Agent, or Firm—Jack Ho

(57) ABSTRACT

An Internet television system and method are comprised of defining different program types or genres, and categorizing television programs into different genres. Each program is associated with a description which includes the assigned genre. The programs are encoded for streaming over the Internet. A Web site is provided for users to access the programs. A scheduler on a Web page is comprised of a plurality of timeslots arranged into a grid. Program genre icons corresponding to the genres are arranged adjacent the grid. A user can build a schedule by dragging the genre icons into selected timeslots, and save the schedule to a database. Programs which have not been watched, or least watched and long ago by the user are automatically selected for the scheduled genres and streamed to the client computer. The programs are allocated to the time available for each genre. Ads are interspersed between the programs.

31 Claims, 4 Drawing Sheets

INTERNET TELEVISION SYSTEM AND METHOD WITH USER SELECTABLE GENRES AND SCHEDULE

BACKGROUND OF THE INVENTION

1. Field of the Invention

This invention relates generally to the delivery of television programs over the Internet.

2. Prior Art

After the Internet gained popularity among consumers in the 1990's, real time delivery of sound and motion video clips over the Internet were made possible. Initially, this so-called multimedia content was limited to crackling sounds and choppy videos that lasted for mere seconds. Rapid advances in picture compression and streaming technology, in combination with the increased availability of broadband connections, soon enabled the delivery of higher quality multimedia content of much longer duration. The technology has mature enough to even enable the delivery of television over the Internet. The interactive nature of the Internet further enables different television programs to be delivered to different users or viewers.

For example, a method for dynamically regulating Internet television content is disclosed in U.S. Pat. No. 5,973,683 to Cragun et al. The content or programming is automatically selected for the viewer based on the viewer's profile and past viewing habits. However, the user has little control over the television programs being supplied and their scheduling. Since what is desired by the viewer is merely estimated, many of the programs provided may not be desirable to the viewer at all.

OBJECTIVES OF THE INVENTION

Accordingly, the objectives of the present Internet television system and method are:

- to deliver television programs and other content over the Internet;
- to enable each user to select different types or genres of programs for delivery;
- to enable each user to receive the selected genres according to a user selected schedule;
- to provide the users with an easy-to-use interface;
- to automatically select a specific program for each genre chosen by the user;
- to automatically insert default programs in time slots not filled by the user;
- to automatically intersperse scheduled programs with ads;
- to automatically update a database with information on watched programs and ads; and
- to enable each user to create a virtual television channel with custom programming.

Further objectives of the present invention will become apparent from a consideration of the drawings and ensuing description.

BRIEF SUMMARY OF THE INVENTION

The present Internet television system and method are comprised of defining different program types or genres, and categorizing available television programs into different genres. Each program is associated with a description which includes the assigned genre. The programs are encoded for streaming over the Internet and stored on servers. A Web site is provided for users to access the programs with a client computer. A scheduler is provided on a Web page at the site. The scheduler is comprised of a plurality of timeslots for each day of the week arranged into a grid. A plurality of different program genre icons corresponding to the genres are arranged adjacent the grid. A user can build a personalized program schedule by dragging the genre icons with a pointer into selected timeslots. A genre icon can be removed from a timeslot by dragging it into a wastebasket icon. The entire grid can be cleared of all icons by clicking a reset-schedule icon. After the user has finished setting up the schedule, a set-my-schedule icon is clicked to save the schedule to a database. Any blank timeslots are populated later with a default schedule. Programs which have not been watched, or least watched and long ago by the user are automatically selected for the scheduled genres and streamed to the client computer. The programs are allocated to the time available for each genre. Ads are interspersed between the programs. The database is updated with information on the programs and ads watched.

DETAILED DESCRIPTION OF THE INVENTION

Figure 1:
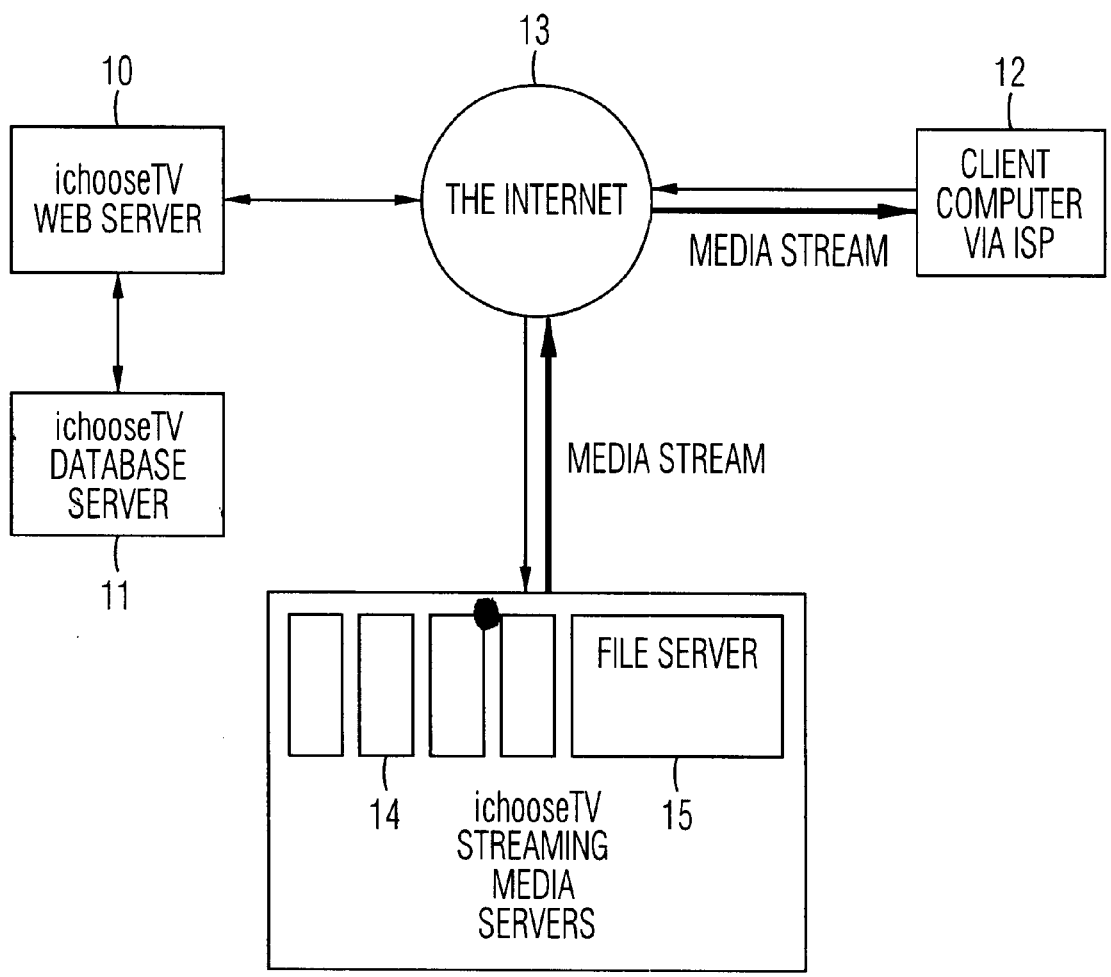
FIG. 1 is a block diagram of the present Internet television system.
Figure 2:
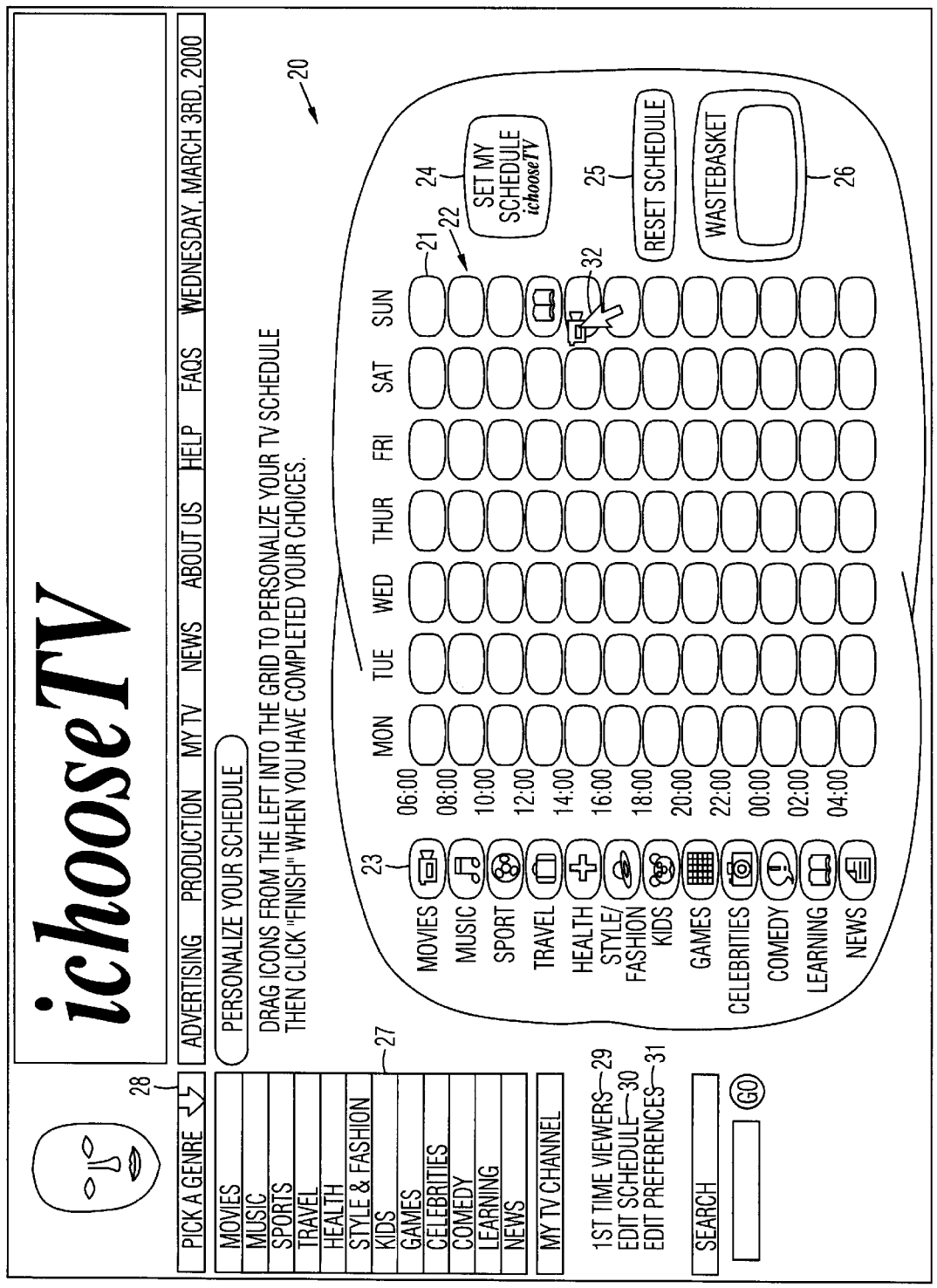
FIG. 2 is a Web-based scheduler according to the present invention in which a user can set up a personalized programming schedule.

FIG. 1:

A preferred embodiment of the present Internet television system is shown in a block diagram in FIG. 1. It is comprised of a Web site for providing a television service, preferably called "ichooseTV", to users or viewers. The Web site is stored on a Web server 10. A database of television programs and users is stored on a database server 11 which is connected to Web server 10. A user or client computer 12 is connected to Web server 10 through the Internet 13. Client computer 12 may comprise any Web-ready device, such as a desktop computer, a notebook computer, a Web television, a personal digital assistant (PDA), a cell phone, etc. Encoded television programs and other content are stored on streaming media servers 14 and file server 15. A media stream of television programs and other content flows from media servers 14 to client computer 12 in response to instructions from Web server 10. Alternatively, another architecture may be used. For example, the Web site, database, and programs can be stored on more or fewer servers.

A preferred embodiment of the present Internet television method is comprised of defining a plurality of program types or genres, such as movies, travel, kids, comedy, news, etc. Other suitable genres may also be defined. Programs and other content available for broadcasting are each associated with a description, which may include information such as the assigned genre, title, censorship information, length of program, streaming or downloading, free or pay-per-view, etc. The descriptions are entered into the database stored on database server 11. The programs are encoded for streaming over the Internet, and stored on media servers 14 and file server 15. The programs are accessible to users through the Web site stored on Web server 10. The programs may comprise any video or audio content, such as television shows, music, slide shows, stock reports, live camera views, etc. Each program may be of any length.

FIG. 2:

A television program scheduler 20 is provided on a Web page of the Web site, and may be written to work under HTML, Flash, or any other suitable language. It is preferably accessible through links on a home page of the Web site. Scheduler 20 is comprised of a plurality of timeslots 21 for each day of the week arranged into a grid 22. Grid 22 is preferably arranged with columns representing the days of the week, and rows representing time periods in each day.

Although timeslots 21 are each two hours in this example, they may be of any length instead. A plurality of program genre icons 23 are arranged adjacent grid 22. A set-my-schedule icon 24, a reset-schedule icon 25, and a wastebasket icon 26 are also provided in scheduler 20. The icons preferably include text labels for clarity. The icons shown are only exemplary; they may be of any suitable graphical design and include any suitable text labels.

Another set of genre icons 27 are arranged under a Pick A Genre heading 28. Genre icons 27 represent the same genres as genre icons 23. A new Web page presenting sample clips of programs in the corresponding genre is displayed when a genre icon 27 is clicked.

A $1^{ST}$-time-viewers icon 29 is provided for first time users to create a new schedule. An edit-schedule icon 30 is provided for existing users to edit their schedules. An edit-preferences icon 31 is provided for users to edit their viewing preferences.

A user can easily build a personalized programming schedule by simply dragging selected genre icons 23 with a pointer 32 into selected timeslots 21. In the example shown, a movies icon is about to be dropped into the Sunday 14:00 hour timeslot, and a learning icon is already placed in the Sunday 12:00 hour timeslot. The user can thus select the desired genres for viewing at the desired times. A genre icon can be removed from a timeslot by dragging it into wastebasket icon 26. Grid 21 can be entirely cleared of all genre icons by clicking reset-schedule icon 25. After the user has finished setting up the schedule, set-my-schedule icon 24 is clicked to save the schedule to the database. Any remaining blank timeslots are later populated by a default schedule, which is defined by a content manager and which can change periodically.

Figure 3A:
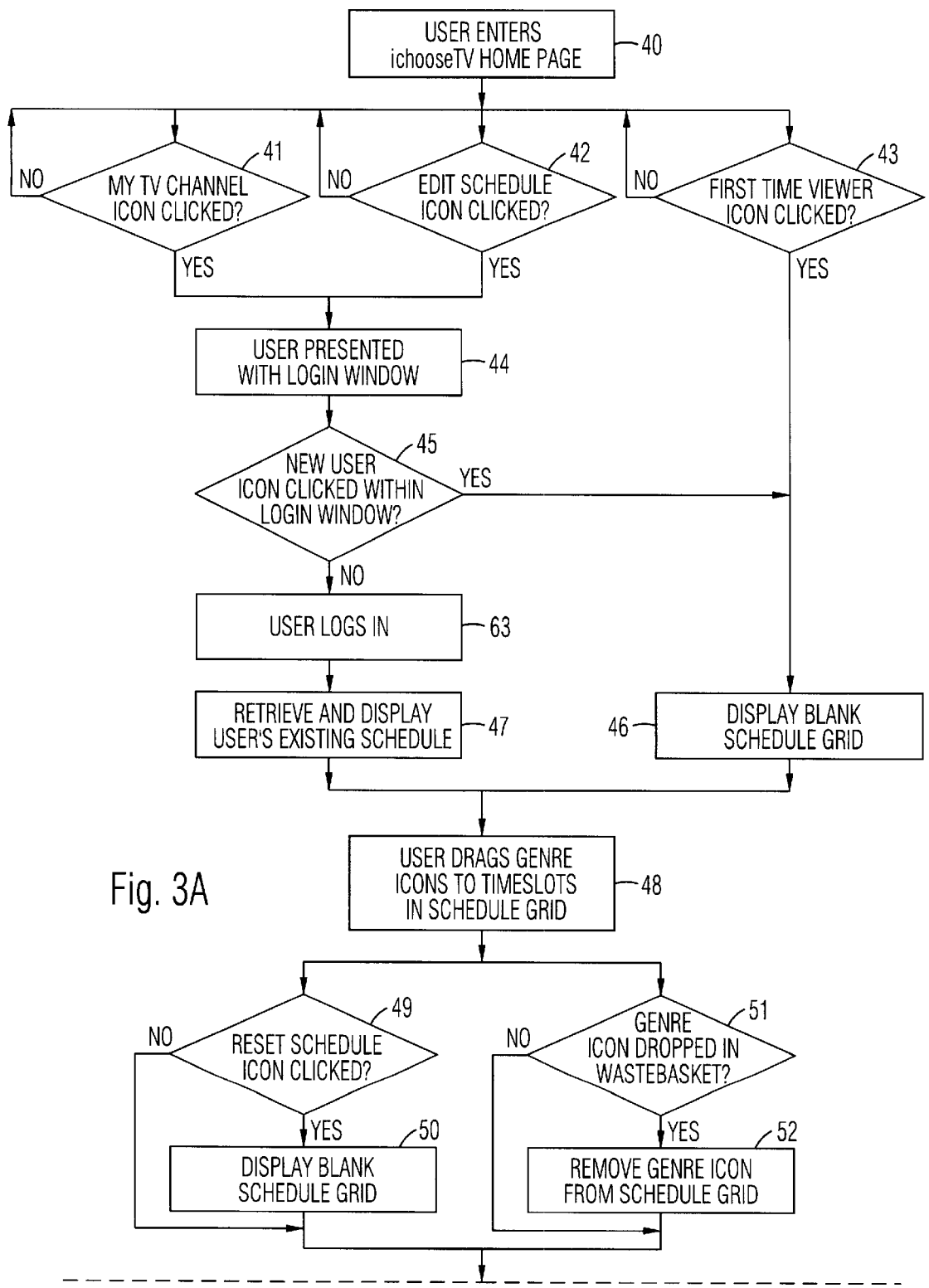
FIG. 3A is a first part of a flowchart showing the present Internet television method.
Figure 3B:
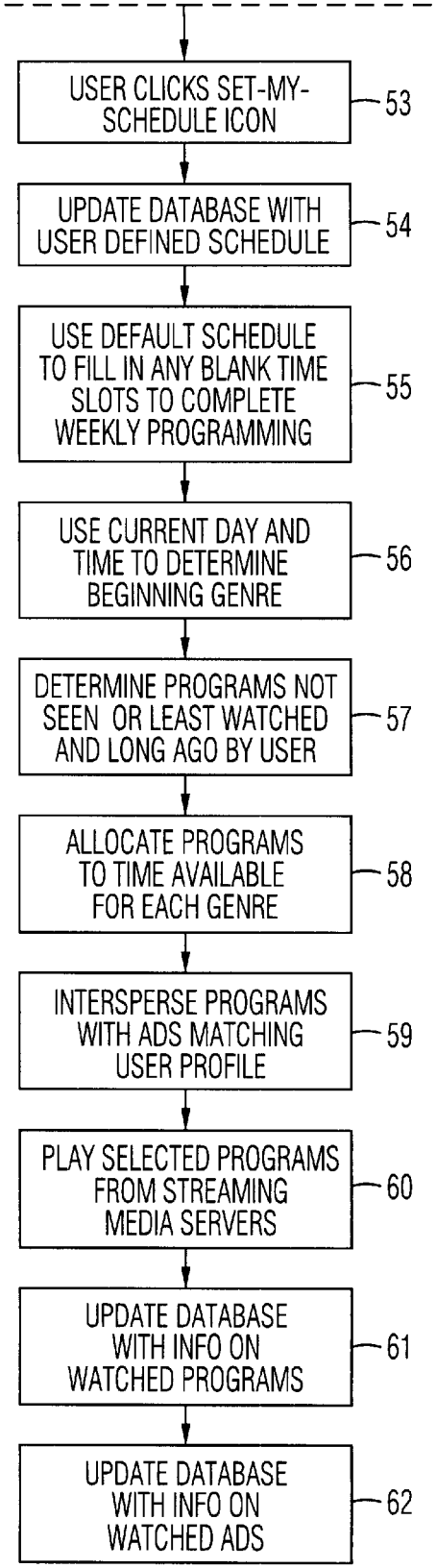
FIG. 3B is a second part of the flowchart.

Programs which have not been watched by the user are automatically selected for the scheduled genres and streamed to the client computer through the Internet. If no unwatched programs exist for the selected genre, programs which are least watched the longest time ago are automatically selected for delivery. The selected programs are allocated to the time available for each scheduled genre. Ads are interspersed between the scheduled programs. The database is updated with information on watched programs and ads. FIGS. 3A–3B:

Starting at the "ichooseTV" Internet television service home page at block 40, a user can click a my-TV-channel icon at block 41, an edit-schedule icon at block 42, or a first-time-viewer icon at block 43. If none of these icons are clicked, the process is looped until one of them is clicked. If either the my-TV-channel icon or the edit-schedule icon is clicked, the user is presented with a login window at block 44. If a new-user icon is clicked within the login window at block 45, the user is presented with a blank schedule grid at block 46. The user is also presented with the blank schedule grid at block 46 if the first-time-viewer icon on the home page is clicked at block 43.

If the new-user icon is not clicked at block 45 and the user is logged in at block 63, the user's existing schedule is retrieved from the database and displayed at block 47. When the genre icons are dragged and dropped by the user into the timeslots at block 48, they are snapped into position within the timeslots. If the reset-schedule icon is clicked at block 49, a blank schedule grid is displayed at block 50. If a genre icon is dragged and dropped into the wastebasket icon at block 51, the genre icon is removed from the grid at block 52.

When the user is satisfied with the schedule and the set-my-schedule icon is clicked at block 53, the database is updated with the user defined schedule at block 54. Any remaining blank timeslots are preferably automatically filled with predetermined default programs to complete the weekly programming schedule at block 55. Alternatively, the blank timeslots may be left blank.

The current day and time is used to determine the beginning genre at block 56. A specific program which has not been seen by the user, or if no unwatched programs exist in the genre, the least watched and long ago in each genre is automatically selected at block 57. The programs are allocated to the time available for each genre at block 58. The programs are interspersed with ads generally matching the user's profile at block 59. The selected program is delivered to the client computer from the media servers and displayed at block 60. The database is updated with information on watched programs after the programs are finished playing at block 61. The database is also updated with information on watched ads after the ads are finished playing at block 62. A personalized, virtual television channel is thus created by the user.

SUMMARY AND SCOPE

Accordingly, the present Internet television system delivers television programs and other content to anywhere in the world. It enables each user to select different types or genres of programs being delivered. It enables each user to receive programs according to a personally selected schedule. It provides the users with an easy-to-use interface. It automatically selects a specific program for each genre chosen by the user. It automatically inserts default programs in time slots not filled by the user. It automatically selects a specific program for each genre chosen by the user. It automatically inserts default programs in time slots not filled by the user. It automatically intersperses scheduled programs with ads. It automatically updates a database with information on watched programs and ads. It thus enables each user to create a virtual television channel with custom programming.

Although the above description is specific, it should not be considered as a limitation on the scope of the invention, but only as an example of the preferred embodiment. Many variations are possible within the teachings of the invention. For example, a different architecture may be used for interconnecting the hardware. The steps of the process may be arranged in a different order. The icon names and shapes may vary. Therefore, the scope of the invention should be determined by the appended claims and their legal equivalents, not by the examples given.

I claim:

1. An Internet television system, comprising:
   one or more servers storing a plurality of television programs which are categorized into a plurality of program genres; and
   a Web page stored on said one or more servers for being accessible to a user with a client computer through the Internet, wherein said Web page includes a scheduler for enabling said user to arrange delivery of said programs to said client computer according to a personalized schedule, wherein said scheduler is comprised of:
   a plurality of timeslots for each day of the week arranged in a grid; and
   a plurality of program genre icons arranged adjacent said grid and corresponding to respective program genres;
   wherein when a selected genre icon is dragged and dropped into a selected timeslot by said user, one of said programs in a corresponding program genre is adapted to be automatically delivered to said client computer through the Internet for display at a time defined by said selected timeslot.

2. The Internet television system of claim 1, wherein said grid is arranged with columns representing the days of the week, and rows representing said timeslots in each day.

3. The Internet television system of claim 1, wherein said one of said programs delivered to said client computer is comprised of an unwatched program in said corresponding program genre which has not been watched by said user, but if no unwatched program exists in said corresponding program genre, said one of said programs delivered to said client computer is comprised of a least watched program.

4. The Internet television system of claim 1, wherein genre icons include text labels for clarity.

5. The Internet television system of claim 1, further including a set-my-schedule icon in said scheduler for saving a user defined program schedule.

6. The Internet television system of claim 1, further including a reset-schedule icon in said scheduler for clearing all of said timeslots in said grid.

7. The Internet television system of claim 1, further including a wastebasket icon in said scheduler for removing said selected genre icon from said selected timeslot.

8. The Internet television system of claim 1, further including a database stored in said one or more servers with information on said television programs, said program genres, and a program schedule defined on said grid by said user.

9. The Internet television system of claim 1, further including means for automatically filling in any blank timeslots with default genres after said user is done dragging and dropping said genre icons into said timeslots.

10. The Internet television system of claim 1, further including means for automatically interspersing scheduled programs with ads.

11. The Internet television system of claim 1, further including means for automatically allocating said one of said programs to time available for said corresponding program genre.

12. The Internet television system of claim 1, further including means for updating a database stored in said one or more servers with information on watched programs.

13. The Internet television system of claim 1, further including means for updating a database stored in said one or more servers with information on watched ads.

14. A method for delivering television programs through the Internet to a client computer, comprising:

categorizing said programs into a plurality of program genres;

providing a scheduler on a Web page which is accessible to a user through the Internet using said client computer, wherein said scheduler is comprised of a plurality of timeslots for each day of the week arranged in a grid, and a plurality of program genre icons corresponding to said genres arranged adjacent said grid;

enabling said user to drag and drop a selected genre icon corresponding to a selected genre into a selected timeslot in said grid;

selecting one of said programs within said selected genre after said selected genre icon is dropped into said selected timeslot; and delivering said one of said programs to said client computer through the Internet at a time defined by said selected timeslot.

15. The method of claim 14, further including encoding said programs for streaming over the Internet, and storing encoded programs on a server.

16. The method of claim 14, further including providing a description of each program when said programs are categorized into said genres, said description including a genre description, storing said description in a database, and selecting said one of said programs based on said description.

17. The method of claim 14, further including selecting a least watched program within said selected genre to be said one of said programs for delivery, but if no unwatched program exists in said selected program genre, selecting a least watched program.

18. The method of claim 14, further including arranging said grid of said timeslots with columns representing the days of the week, and rows representing said timeslots in each day.

19. The method of claim 14, further including providing a set-my-schedule icon in said scheduler for saving a user defined program schedule.

20. The method of claim 14, further including providing a reset-schedule icon in said scheduler for clearing all of said timeslots in said grid.

21. The method of claim 14, further including providing a wastebasket icon in said scheduler for removing said selected genre icon from said selected timeslot.

22. The method of claim 14, further including storing in a database descriptions of said television programs, said program genres, and a program schedule defined on said grid by said user.

23. The method of claim 14, further including filling in any blank timeslots with default genres after said user is done dragging and dropping said genre icons into said timeslots.

24. The method of claim 14, further including interspersing scheduled programs with ads.

25. The method of claim 14, further including allocating said one of said programs to time available for said corresponding program genre.

26. The method of claim 14, further including updating a database with information on watched programs.

27. The method of claim 14, further including updating a database with information on watched ads.

28. A method for a user to schedule television programs for delivery to a client computer through the Internet, comprising:

accessing a Web page through the Internet with said client computer, wherein said Web page includes a scheduler comprised of a plurality of timeslots for each day of the week arranged in a grid, and a plurality of program genre icons corresponding to a plurality of program genres arranged adjacent said grid;

dragging and dropping a selected genre icon corresponding to a selected genre into a selected timeslot in said grid; and receiving on said client computer one of said programs within said selected genre at a time defined by said selected timeslot.

29. The method of claim 28, further including clicking a set-my-schedule icon in said scheduler for saving a user defined program schedule.

30. The method of claim 28, further including clicking a reset-schedule icon in said scheduler for clearing all of said timeslots in said grid.

31. The method of claim 28, further including dropping said selected genre icon in a wastebasket icon in said scheduler for removing said selected genre icon from said selected timeslot.

* * * * *